United States Patent [19]

Vandagriff

[11] Patent Number: 4,950,021

[45] Date of Patent: Aug. 21, 1990

[54] ADJUSTABLE SUN VISOR ATTACHMENT

[76] Inventor: Craig G. Vandagriff, 24637 Gardenstone La., West Hills, Calif. 91307

[21] Appl. No.: 478,546

[22] Filed: Feb. 12, 1990

[51] Int. Cl.⁵ .............................................. B60J 3/02
[52] U.S. Cl. .................................. 296/97.6; 296/97.8; 296/97.11; 296/97.12; 296/97.13
[58] Field of Search ..................... 296/97.1, 97.5, 97.6, 296/97.8, 97.11, 97.12, 97.13

[56] References Cited

U.S. PATENT DOCUMENTS

| 2,453,843 | 11/1948 | Hanson | 296/97.5 X |
| 2,823,950 | 2/1958 | Harris | 296/97.6 |
| 2,829,920 | 4/1958 | Cohen | 296/97.11 |
| 3,445,135 | 5/1969 | Masi | 296/97.8 X |
| 4,580,829 | 4/1986 | Matheopoulos | 296/97.6 |

FOREIGN PATENT DOCUMENTS

| 1138842 | 6/1957 | France | 296/97.8 |
| 2313226 | 12/1976 | France | 296/97.8 |

*Primary Examiner*—Margaret A. Focarino
*Assistant Examiner*—Gary C. Hoge
*Attorney, Agent, or Firm*—Poms, Smith, Lande & Rose

[57] ABSTRACT

An adjustable sun visor attachable to the pre-existing sun visor of a vehicle. The adjustable sun visor releasably attaches to a pre-existing sun visor and is adjustable both longitudinally, downwardly and in a circular relationship to the pre-existing visor. The adjustable sun visor includes a panel section or sections that can be swung away from the mounting of the adjustable sun visor to the pre-existing visor.

9 Claims, 3 Drawing Sheets

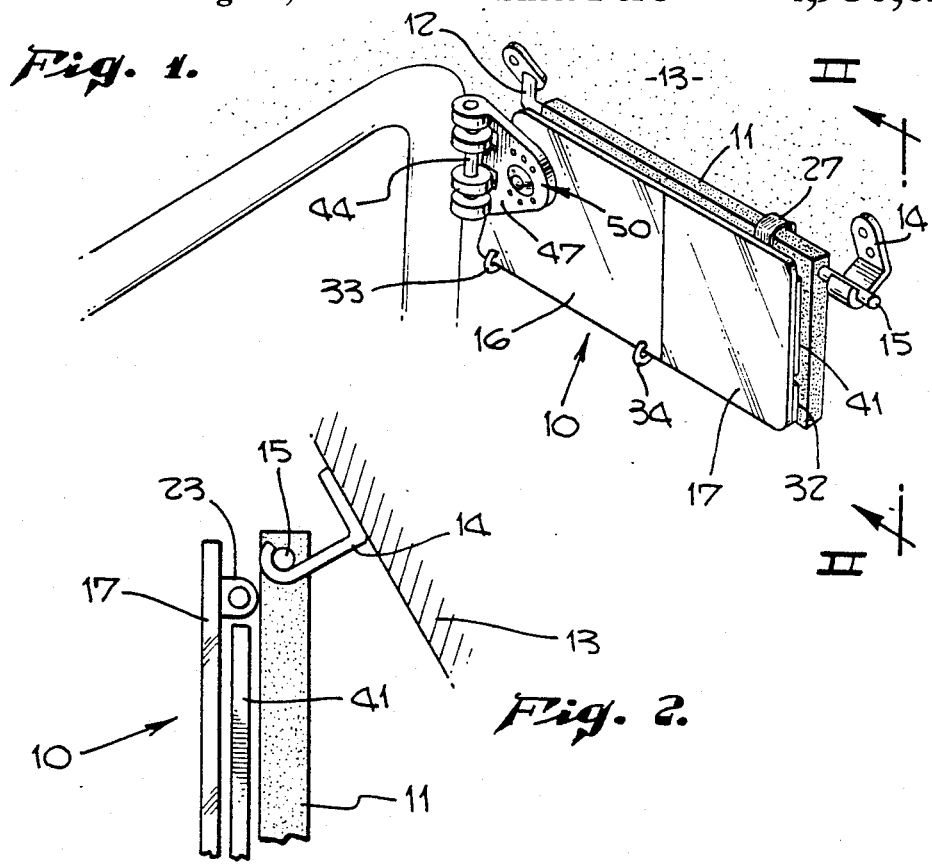
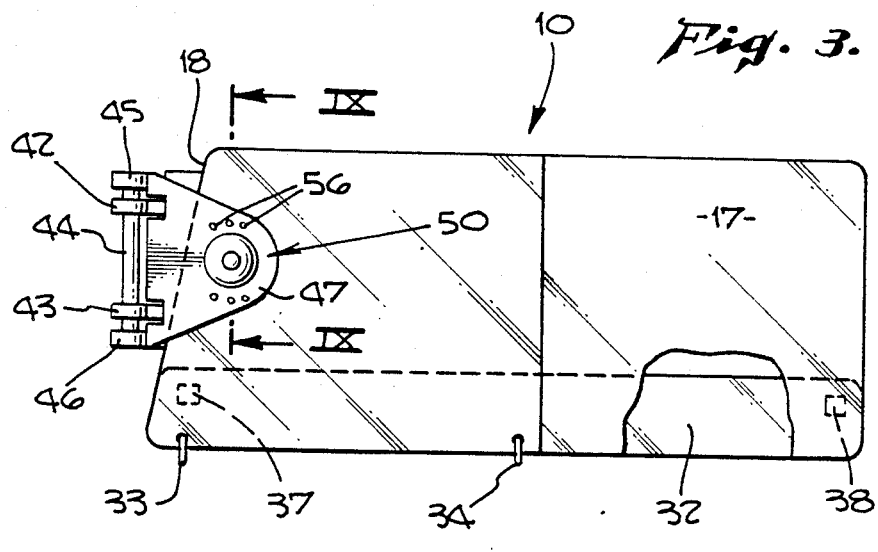

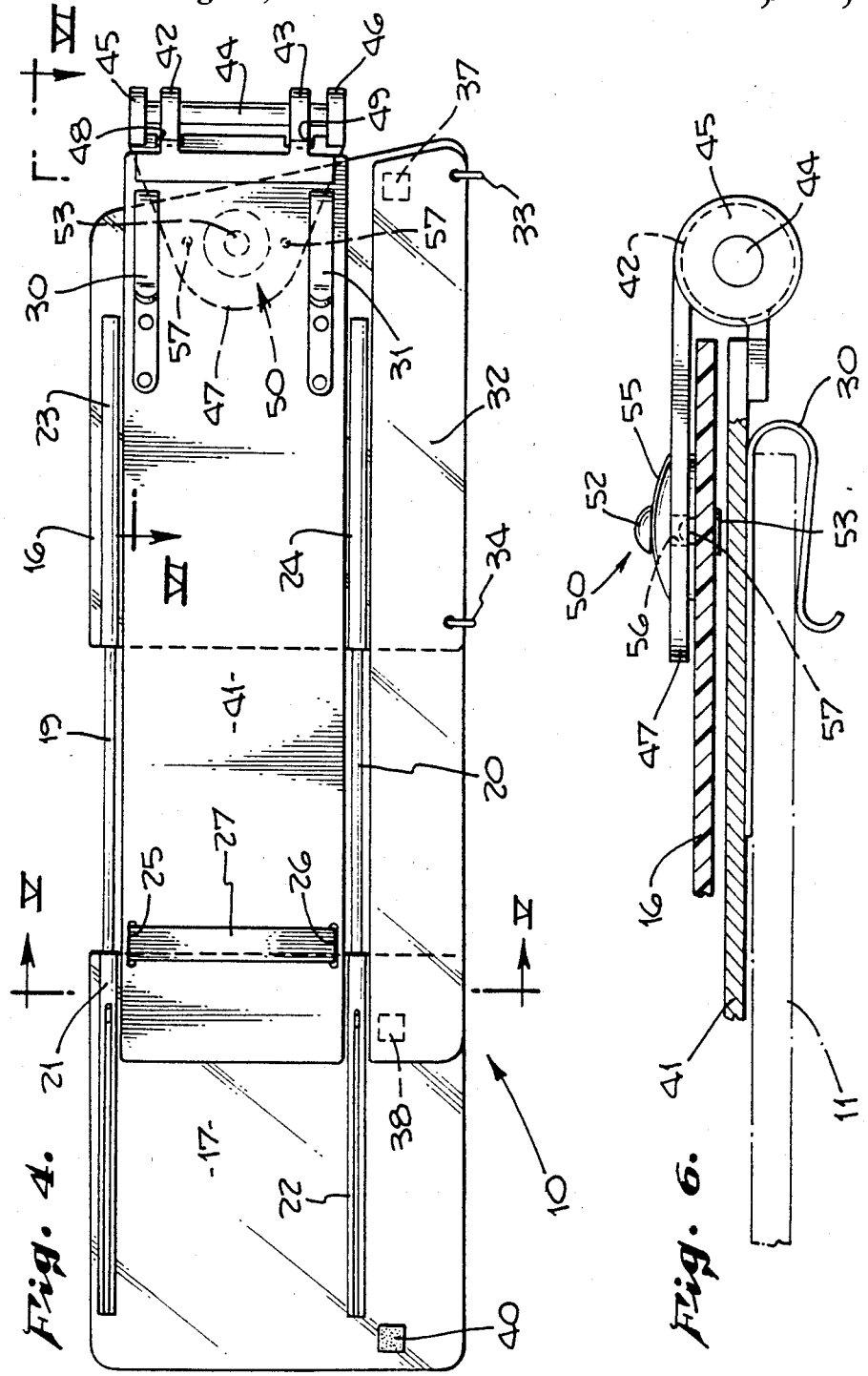

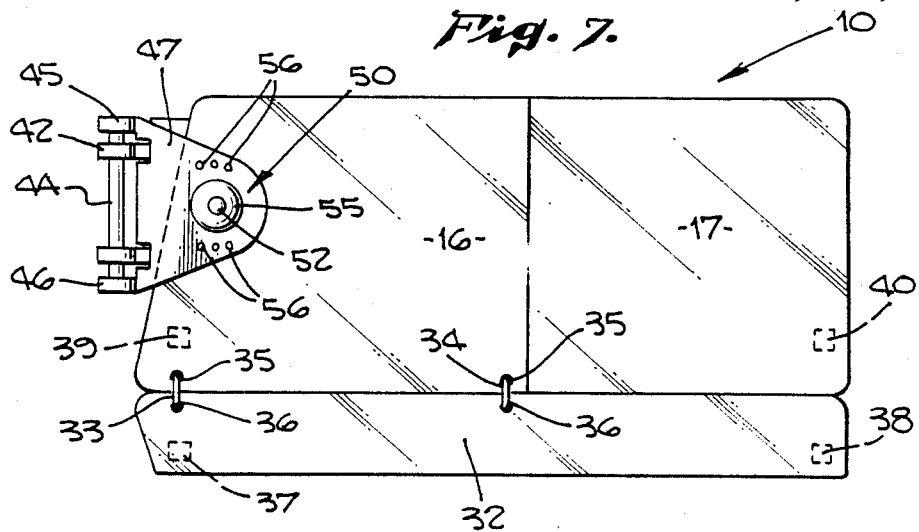
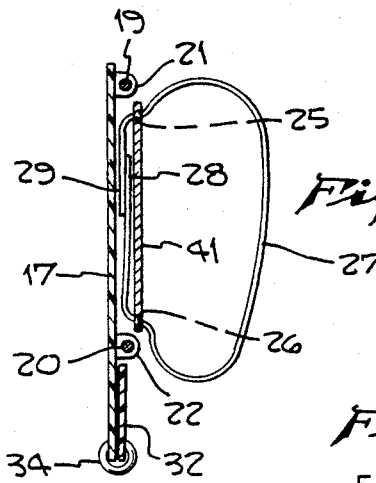
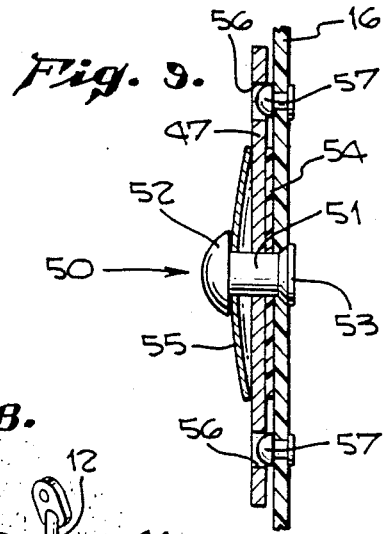
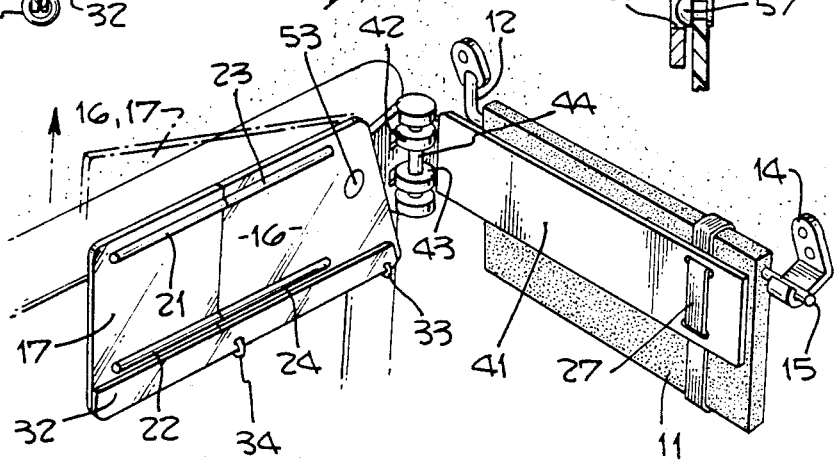

ADJUSTABLE SUN VISOR ATTACHMENT

BACKGROUND OF THE INVENTION

1. Field of the Invention

The invention relates to a sun visor attachments; and, more particularly, to a multi-adjustable sun visor adapted to be attached to a pre-existing visor in a vehicle to provide a variety of adjustments.

2. Description of the Prior Art

Many devices have been proposed in the past for shielding the sun's rays from the eyes of drivers and their passengers. Almost all vehicles have a visor that swivels outwardly and downwardly from the roof or mounting of the vehicle. Such visors only cover a limited area and it is difficult to swing or pivot the same to block substantially all directions of the sun's rays. For example, there is a space between the driver's visor and the passenger's visor that is not generally covered by either visor. Although many attachments have been suggested in the past, no visor attachment is known which quickly and easily snaps onto a pre-existing visor, can be swung outwardly therefrom and rotate to a variety of positions, yet provide for both longitudinal and vertical extension of the visor.

SUMMARY OF THE INVENTION

It is an object of this invention to provide a sun visor attachment for a conventional visor which can be adjusted longitudinally, vertically and swung out to provide side blockage with angular circular adjustment.

It is a further object of this invention to provide such adjustable sun visor which can be fixed in a plurality of spaced angular positions.

These and other objects are preferably accomplished by providing an adjustable sun visor that is attachable to the pre-exising sun visor of a vehicle. The adjustable sun visor releasably attaches to the pre-existing sun visor and is adjustable both longitudinally, downwardly and in a circular relationship to the pre-existing visor. The adjustable sun visor includes a panel section or sections that can be swung away from the mounting of the adjustable sun visor to the pre-existing visor.

BRIEF DESCRIPTION OF THE DRAWING

FIG. 1 is a perspective view of a sun visor attachment in accordance with the invention mounted on the conventional driver's side sun visor of a vehicle, the conventional visor being swiveled to the down position;

FIG. 2 is a view taken along lines II—II of FIG. 1;

FIG. 3 is a front elevational view of the sun visor attachment alone of FIGS. 1 and 2;

FIG. 4 is a rear elevational view of the sun visor attachment alone of FIGS. 1 and 2;

FIG. 5 is a view taken along lines V—V of FIG. 4;

FIG. 6 is a view taken along lines VI—VI of FIG. 4, the conventional visor of FIG. 1 being shown as inserted into clip 30 for convenience of illustration;

FIG. 7 is a view similar to FIG. 3 showing extension 32 in the "down" position, the stored position being shown in dotted lines in FIG. 3;

FIG. 8 is a view similar to FIG. 1 showing sections 16, 17 pivoted away from section 41; and FIG. 9 is a view taken along IX—IX of FIG. 3.

DESCRIPTION OF THE PREFERRED EMBODIMENT

Referring now to FIG. 1 of the drawing, an adjustable sun visor attachment 10 is shown attached to the conventional sun visor 11 of a vehicle. As seen in FIG. 1, visor 11 pivots about an L-shaped rod 12 extended from the roof or ceiling 13 of a vehicle, the rod 12 being inserted into visor 11 so that the latter can pivot about rod 12 as is well known in the art. The opposite end of visor 11 has a shaft 15 releasably snapping into a U-shaped bracket 14 (see also FIG. 2) fixed to the roof 13 of the vehicle, again as is well known in the art.

As seen in FIG. 3, visor 10 has a pair of front planar sections 16, 17 and a rear planar section 41 (FIG. 4). Section 17 may be generally rectangular and section 16 may also be generally rectangular with a sloping side or end 18.

The overall length of sections 16, 17, when in the FIG. 3 position, is generally related to the overall length of visor 11. The overall width of sections 16, 17 is also generally related to the overall width or height of visor 11.

As seen in FIG. 4, section 17 is longitudinally movable along a pair of spaced rods 19, 20. As seen in FIG. 5, section 17 has a pair of elongated hollow tubes 21, 22 glued or otherwise secured to the back of section 17. Rods 19, 20 slide into each respective tube 21, 22 and, thus, section 17 is slidably movable along tubes 21, 22. In like manner, a pair of hollow tubes 23, 24 are provided on the back of section 16, as seen in FIG. 4, and rods 19, 20 are receivable in each respective tube 23, 24, as shown. As seen in FIGS. 4 and 5, a pair of spaced slots 25, 26 are provided through section 41 and an endless loop 27 of a resilient flexible material, with overlapping ends 28, 29, stitched or otherwise secured together, extend through slots 25, 26 for reasons to be discussed.

As seen in FIG. 4, a pair of resilient U-shaped clips 30, 31 are provided on the back of section 41 extending generally parallel to the longitudinal axis of visor 10. As seen in FIG. 6, it can be seen that the conventional visor 11 snap fits into clips 30, 31 and, thus, visor 10 is quickly and easily removable therefrom.

An elongated generally rectangular visor extension 32 is provided swivelly connected to section 16 (see particularly FIG. 7) by a pair of spaced rings 33, 34. Rings 33, 34 pass through suitable aligned holes 35, 36 in section 16 and extension 32, respectively.

Extension 32 is shown in the down position in FIG. 7 and in the up or stored position in FIG. 8. Extension 32 can be retained in the FIG. 3 position until needed in any suitable manner, such as by providing mating patches of conventional hook and material, e.g., patches 37, 38 on extension 32 (shown in dotted lines in FIG. 7) adapted to mate with mating patches 39, 40, respectively, on panel sections 16, 17, respectively, (dotted lines in FIG. 7). When in the FIGS. 3 and 4 position, patches 37 to 40 mesh and retain extension 32 in the stored position.

Panel sections 16, 17, as seen in FIG. 8, can be swung away from section 41. Thus, section 41 is fixedly secured to a pair of spaced round apertured bosses 42, 43 receiving a round rod 44 therethrough. Thus, bosses 42, 43 swivel or rotate about rod 44. The upper and lower ends of rod 44 are integral with spaced bosses 45, 46. A generally triangularly shaped flange 47 (see also FIG. 3) is fixed secured to upper and lower bosses 45, 46, respectively, spaced slots 48, 49 being provided in the base of flange 47 to provide for rotation of bosses 42, 43 therein. Thus, panel sections 16, 17 can rotate from the FIG. 8 to the FIG. 1 position away from section 41 about rod 44. The width of section 41 is slightly less than the spacing between tubes 23, 24 on section 41 so that it is disposed or stored therebetween until use. The overall length thereof is generally related to the overall length of sections 16, 17 when in the FIG. 7 position.

Flange 47 is secured to panel section 16 by rivet 50 (FIG. 9). As seen in FIG. 9, rivet 50 has a shank 51 and an enlarged head 52. Shank 51 extends through panel section 16 and is enlarged or deformed at 53. A teflon washer 54 may be provided between panel section 16 and flange 47 to provide for frictionless movement. A generally circular convex spring washer 55 is provided receiving shank 51 therethrough (shank 51 also passing through a suitable aperture in washer 53) with enlarged head 52 abutting against the exterior of spring washer 55. A plurality of spaced holes 56 are provided about the flange 47 in a generally circular array (see also FIG. 3) adapted to align with a dimple, such as rivet 57 (FIG. 9) extending through and fixed in a suitable opening in panel section 16. As seen in FIG. 8, sections 16, 17 can thus be swivelled or rotated from the solid line position to the dotted line position to vary the angle of sections 16, 17 when panel section 41 is in the FIG. 8 position. The spring bias of washer 55 allows sections 16, 17, coupled to flange 47 via rivet 50, to be moved slightly away from flange 47 (due to the bias of spring washer 55), and rotated from the solid line position in FIG. 8 to the dotted line position, with one of the apertures or holes 56 aligning with rivet 57, the latter snapping into the same as seen in FIG. 9. This retains the sections 16, 17 in the desired angular position.

In operation, visor 10 is attached to the conventional pre-existing sun visor 11 of the vehicle (FIG. 1) via clips 30, 31. Although shown in FIG. 1 as attached to the driver's visor, obviously visor 10 can be attached to the visor on the passenger side. Resilient loop 27 is placed about the conventional visor 11 to provide added support. As seen in FIG. 4, panel section 17 can be slid along rods 19, 20 to the position shown to extend the overall length of visor 10. Extension 32 can be swung down from the FIG. 4 to the FIG. 7 position to extend the overall width of visor 10. As seen in FIG. 8, panel sections 16, 17 can be swung or pivoted about rod 44 away from panel 41 (which may be clamped to visor 11 as seen in FIG. 1) to provide side window blockage or sun shading. Finally, as also seen in FIG. 8, panel sections 16, 17 can be swivelled or pivoted, as heretofore discussed, about rivet 50 and spring washer 55 to a variety of positions as seen in dotted lines in FIG. 8. This, of course, provides for a wide variation in side window blocking of the sun and, thus, makes the visor 10 quite versatile. The conventional visor 11 can be returned to the "up" or stored position with visor 10 attached (or the latter can be removed, if desired).

Any suitable materials may be used. Panel sections 16, 17 and 41 may be of an opaque plastic material for blocking or shading the sun's rays. Any suitable means may be used for interconnecting the parts or to provide means for swiveling sections 16, 17 away from section 41. Obviously, other means may occur to the artisan for providing rotation of panel sections 16, 17 with respect to flange 47 and retaining such sections 16, 17 in a fixed position.

There is thus disclosed a unique and novel multi-adjustable visor which can be easily snapped into position on a conventional visor, then adjusted for rotation and movement in various directions.

I claim:

1. A sun visor adapted to be attachable to the pre-existing sun visor of a vehicle comprising:
    a main elongated panel section having clamping means for removably clamping said panel section to a pre-existing sun visor;
    a flange pivotally mounted to said panel section adjacent said clamping means;
    a first panel fixedly secured to said flange;
    a second panel secured to said first panel, said first and second panels forming a generally rectangular elongated planar panel section generally of length related to the overall length of said main panel section, said second panel being slidably mounted to said first panel and movable from a first position adjacent to said first panel to a second position remote from said first panel; and
    said elongated planar panel section being pivotally attached to said flange and movable with respect thereto in a plane parallel to said flange about said flange.

2. In the visor of claim 1 wherein an elongated visor extension is pivotally connected to said first panel and movable from a first stored position with respect to said first panel to a second operative position underlying said first panel but lying in generally the same plane as said first panel.

3. In the visor of claim 2 wherein said visor extension is of generally the same overall length as said first and second panels when said second panel is disposed adjacent said first panel.

4. In the visor of claim 2 wherein said visor extension and said first panel have releasable cooperating securement means for releasably attaching said extension portion to said first panel when in said stored position.

5. In the visor of claim 1 wherein said first panel is pivotally connected to said flange by spring biased mounting means whereby said first panel can be rotated about said flange with said spring bias retaining said first panel in position against said flange when released from rotation.

6. In the visor of claim 5 including cooperating indexing means on said first panel and said flange for indexing said first panel to said flange in a variety of positions.

7. In the visor of claim 6 wherein said indexing means includes a dimple of said first panel and a plurality of spaced holes in a generally circular array on said flange, said dimple adapted to snap into one of said spaced holes to thereby retain the first panel in a fixed position on said flange.

8. In the visor of claim 1 wherein said first panel has a pair of spaced tracks thereon coaxially aligned with a like pair of spaced tracks on said second panel, and second panel being slidably mounted to said first panel by a pair of spaced rods, each of said rods having one end fixed in one of said pair of spaced tracks on said first panel and the other end slidably mounted in one of said pair of spaced tracks on said second panel whereby said second panel is slidable along said rods.

9. In the visor of claim 8 wherein the overall width of said main panel section is slightly less than the spacing between said tracks whereby said panel section is disposed between said tracks when said first and second panels are pivoted to a position abutting against said panel section.

* * * * *